(12) United States Patent
Yi et al.

(10) Patent No.: US 9,098,146 B2
(45) Date of Patent: Aug. 4, 2015

(54) MULTI-TOUCH SENSING APPARATUS USING REAR VIEW CAMERA OF ARRAY TYPE

(75) Inventors: Kwon Ju Yi, Yongin-si (KR); Chang Kyu Choi, Seongnam-si (KR); Jae Joon Han, Seoul (KR); Du-Sik Park, Suwon-si (KR); Woon Bae Kim, Suwon-si (KR); Jong Oh Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 821 days.

(21) Appl. No.: 12/816,718

(22) Filed: Jun. 16, 2010

(65) Prior Publication Data

US 2010/0315381 A1 Dec. 16, 2010

(30) Foreign Application Priority Data

Jun. 16, 2009 (KR) .................. 10-2009-0053202

(51) Int. Cl.
G06F 3/042 (2006.01)
(52) U.S. Cl.
CPC ................... G06F 3/0425 (2013.01)
(58) Field of Classification Search
CPC ..................................... G06F 3/0425
USPC .................................. 345/173, 175
See application file for complete search history.

(56) References Cited

U.S. PATENT DOCUMENTS

| 5,942,761 | A  | * | 8/1999 | Tuli ................. 250/556 |
| 7,161,592 | B2 | * | 1/2007 | Murade ............ 345/206 |
| 7,705,835 | B2 | * | 4/2010 | Eikman ........... 345/176 |
| 2007/0069974 | A1 | * | 3/2007 | Kawata et al. ...... 345/1.1 |
| 2008/0121442 | A1 | * | 5/2008 | Boer et al. ........ 178/18.09 |
| 2008/0150913 | A1 | * | 6/2008 | Bell et al. ......... 345/175 |
| 2009/0027358 | A1 | * | 1/2009 | Hosono ............ 345/175 |
| 2009/0128508 | A1 | * | 5/2009 | Sohn et al. ........ 345/173 |
| 2009/0219253 | A1 | * | 9/2009 | Izadi et al. ....... 345/173 |
| 2009/0309844 | A1 | * | 12/2009 | Woo et al. ........ 345/173 |
| 2010/0302196 | A1 | * | 12/2010 | Han et al. ......... 345/173 |

FOREIGN PATENT DOCUMENTS

| JP | 2004-94569 | 3/2004 |
| JP | 2006-172470 | 6/2006 |
| JP | 2007-42093 | 2/2007 |
| JP | 2007-226439 | 9/2007 |
| JP | 2008-152752 | 7/2008 |
| JP | 2008-158616 | 7/2008 |
| JP | 2008-234477 | 10/2008 |
| JP | 2008-305087 | 12/2008 |
| KR | 10-2007-0038430 | 4/2007 |
| KR | 10-2008-0028208 | 3/2008 |
| KR | 10-2008-0055599 | 6/2008 |

(Continued)

Primary Examiner — Kwang-Su Yang
(74) Attorney, Agent, or Firm — NSIP Law

(57) ABSTRACT

A multi-touch sensing apparatus using a rear view camera of an array type is provided. The multi-touch sensing apparatus may include a display panel to display an image, a sensing light source to emit light to sense a touch image which is generated by an object and displayed on a back side of the display panel, and a camera to divide and sense the touch image. The camera may be arranged in an edge of a lower side of the multi-touch sensing apparatus, or a mirror to reflect the touch image may be included in the multi-touch sensing apparatus.

7 Claims, 16 Drawing Sheets

(56) References Cited

FOREIGN PATENT DOCUMENTS

| KR | 10-2008-0098787 | 11/2008 |
| KR | 10-2008-0100008 | 11/2008 |
| KR | 10-2008-0101164 | 11/2008 |
| KR | 10-2009-0026957 | 3/2009 |

* cited by examiner

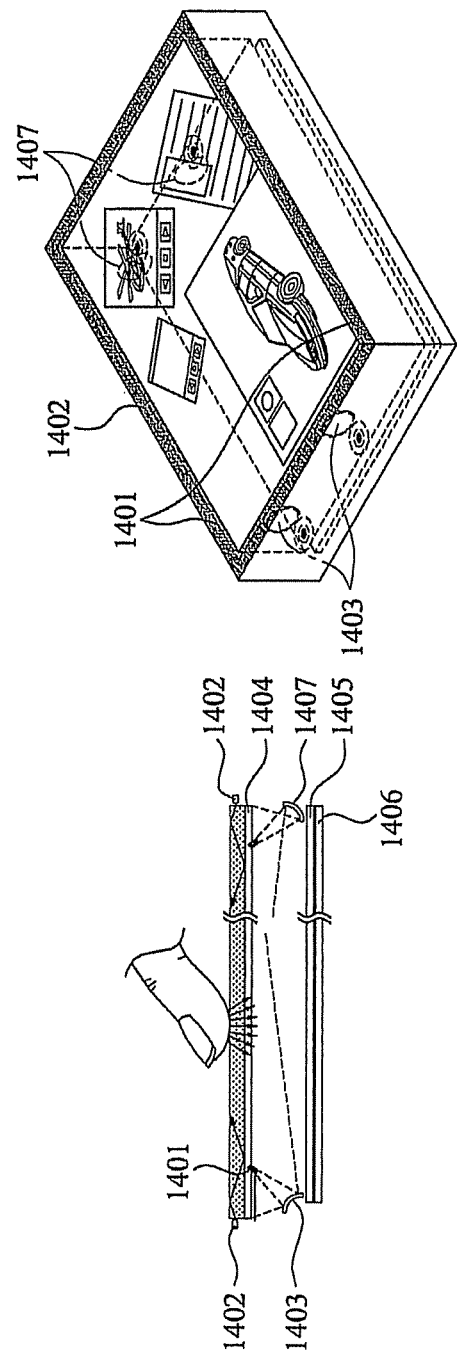

MULTI-TOUCH SENSING APPARATUS USING REAR VIEW CAMERA OF ARRAY TYPE

CROSS-REFERENCE TO RELATED APPLICATIONS

This application claims the benefit of Korean Patent Application No. 10-2009-0053202, filed on Jun. 16, 2009, in the Korean Intellectual Property Office, the disclosure of which is incorporated herein by reference.

BACKGROUND

1. Field

Example embodiments relate to a multi-touch sensing apparatus using a rear view camera of an array type, and more particularly, to various types of multi-touch sensing apparatuses that may sense a touch image, generated by an object, in high resolution.

2. Description of the Related Art

An interest in technologies identifying a location of an object to touch a display has recently increased. In particular, a technology that senses a plurality of touch images as opposed to a single touch image through an object has becomes important. Also, since a display panel that a user may touch is used for a portable device, reduction of thickness is required. In a related art, a device for sensing a touch image may be thick, and therefore has limited uses. Also, an array type substrate is arranged below a Light-Emitting Diode (LED) display panel, and thus a quality of an output image and a touch resolution may be degraded.

SUMMARY

Accordingly, it is an aspect of the present invention to provide a thin apparatus that may sense a touch image in high resolution, and be applied to a flat display.

Additional aspects and/or advantages will be set forth in part in the description which follows and, in part, will be apparent from the description, or may be learned by practice of the invention.

The foregoing and/or other aspects of the present invention may be achieved by providing a multi-touch sensing apparatus, including: a display panel on an upper side of the multi-touch sensing apparatus, and to display an image; a sensing light source to emit a light to sense a touch image which is generated by an object and displayed on a back side of the display panel, the object being located on the display panel; and a camera to divide and sense the touch image, wherein the camera is arranged in an edge of a lower side of the multi-touch sensing apparatus.

The sensing light source may be arranged adjacent to the camera, and emit the light to a sensing area of the camera, and the camera may sense the touch image reflected by the object.

The sensing light source may be arranged to emit the light to an inside of a transparent layer, and the transparent layer may be located on an upper side of the display panel, and generate a total internal reflection of the light emitted from the sensing light source.

The foregoing and/or other aspects of the present invention may be achieved by providing a multi-touch sensing apparatus, including: a display panel on an upper side of the multi-touch sensing apparatus and to display an image; an optical shutter on a lower side of the display panel and to change an optical transmission according to electric switching; a sensing light source to emit a light to sense a touch image which is generated by an object and displayed on a back side of the display panel, the object being located on the display panel; and an image sensor to be arranged on an edge of a lower side of the multi-touch sensing apparatus, and to divide and sense the touch image, wherein the optical shutter shuts or passes the light, emitted by the sensing light source to the display panel, by changing the optical transmission.

The foregoing and/or other aspects of the present invention may be achieved by providing a multi-touch sensing apparatus, including: a display panel on an upper side of the multi-touch sensing apparatus and to display an image; a sensing light source to emit a light to sense a touch image which is generated by an object and displayed on a back side of the display panel, the object being located on the display panel; a mirror on an edge of a lower side of the multi-touch sensing apparatus and to reflect the touch image; and a camera to divide the touch image reflected by the mirror and to sense the touch image, wherein the camera is arranged below the display panel.

BRIEF DESCRIPTION OF THE DRAWINGS

These and/or other aspects will become apparent and more readily appreciated from the following description of the example embodiments, taken in conjunction with the accompanying drawings of which:

FIGS. 14A and 14B illustrate a multi-touch sensing apparatus that senses a touch image using a concave mirror or a convex mirror according to example embodiments.

DETAILED DESCRIPTION

Figure 1:
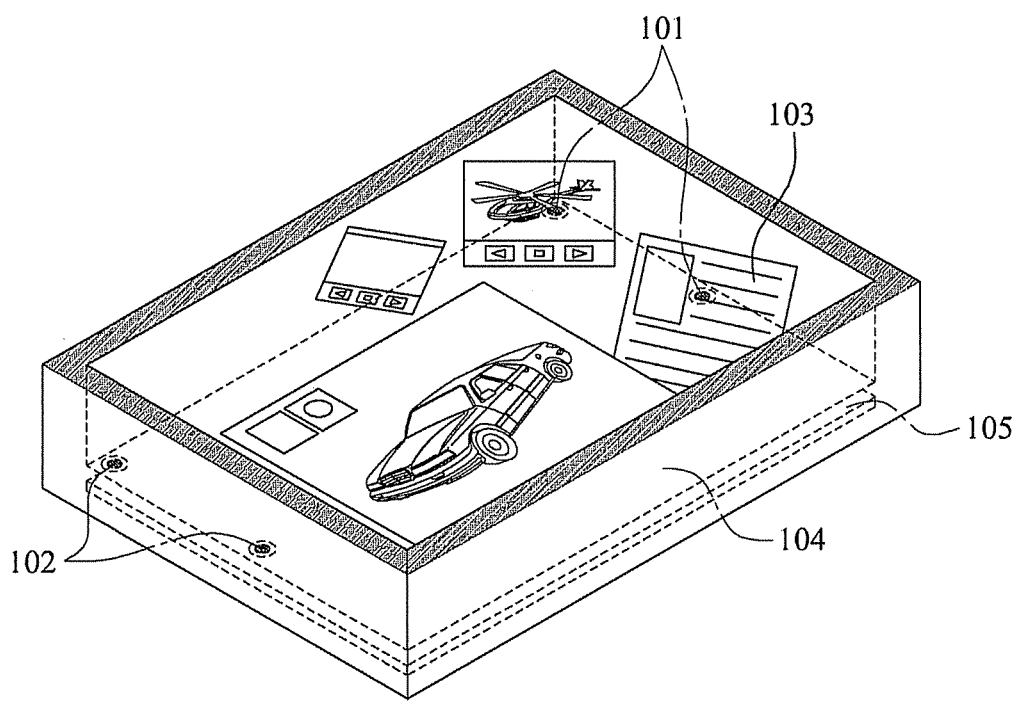
FIG. 1 illustrates a configuration of a multi-touch sensing apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a configuration of a multi-touch sensing apparatus according to example embodiments.

The multi-touch sensing apparatus is illustrated in FIG. 1. Cameras 101 and 102 may sense a touch image displayed on a back side of a display panel 103. Specifically, the cameras 101 and 102 may sense the touch image generated by an object located on the display panel 103. That is, when a user touches an image, displayed on the back side of the display panel 103, through an object such as a stick or hand of the user, the cameras 101 and 102 may sense the touch image generated by the object.

The cameras 101 and 102 may divide the image displayed on the back side of the display panel 103 into at least two images, and sense the divided images, respectively. Each of the cameras 101 and 102 may include one of a Charge-Coupled Device (CCD) sensor and a Complementary Metal-Oxide-Semiconductor (CMOS) sensor that may convert an inputted two-dimensional (2D) image into a digital signal. The 2D image may be inputted through a lens.

The multi-touch sensing apparatus may recognize a location of the touch image as coordinates of the display panel 103, and determine a location touched by the user through the object. For example, the display panel 103 may be a Liquid Crystal Display (LCD) panel. Since the LCD panel may not be self-illuminous, the multi-touch sensing apparatus may include a backlight 104 providing light to display an image.

The backlight 104 may combine a Cold Cathode Fluorescent Lamp (CCFL) or a Light Emitting Diode (LED) with an optical film such as a diffuser, a reflecting plate, and a prism sheet, and thereby may be embodied as a surface light source to provide light to the LCD panel. As illustrated in FIG. 1, the cameras 101 and 102 may be arranged in an edge of a lower side of the multi-touch sensing apparatus in order not to affect light emitted by the backlight 104.

Also, the multi-touch sensing apparatus may include an analysis apparatus 105 that analyzes the touch image through the cameras 101 and 102. The cameras 101 and 102 may sense the touch image displayed on the back side of the display panel 103. The analysis unit 105 may calculate a coordinate of the location where the user touches on the display panel 103.

For example, when the touch image is sensed through an infrared ray (IR), the analysis apparatus 105 may determine the touched location after quantizing, encoding, and simplifying the image. Also, when the touch image is sensed through a visible ray, the analysis apparatus 105 may sense the touch image after removing an effect of an output image from the sensed image. When the multi-touch sensing apparatus includes the cameras 101 and 102 which are inclined by a predetermined angle, the multi-touch sensing apparatus may include a distortion correction apparatus that corrects distortion of the touch image due to the inclination.

Figure 2A:
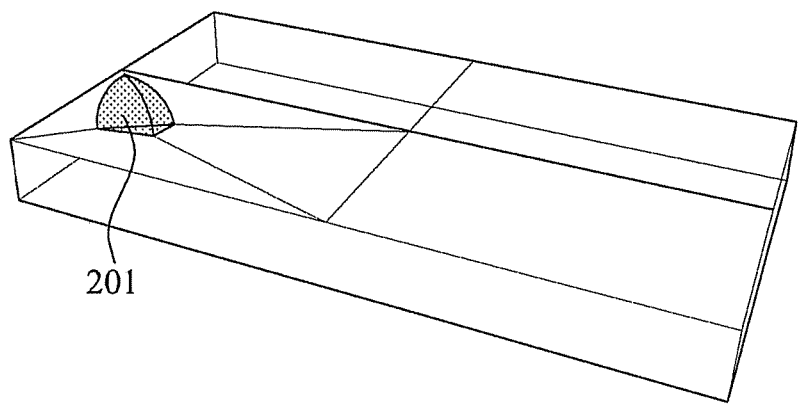
FIGS. 2A and 2B illustrate examples of an image distortion due to a location of a camera according to example embodiments.
Figure 2B:
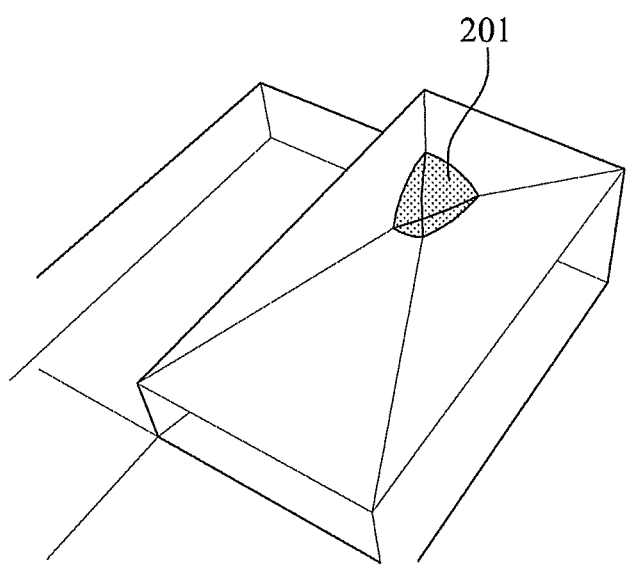

FIGS. 2A and 2B illustrate examples of an image distortion due to a location of a camera according to example embodiments.

A multi-touch sensing apparatus according to example embodiments may be embodied as a thin type where a camera is arranged in an edge of a lower side of the multi-touch sensing apparatus. However, when the multi-touch sensing apparatus is embodied as the thin type, a distance to sense a touch image through the camera may be relatively small and the inclined camera may sense the touch image. Accordingly, the sensed touch image may be distorted as illustrated in FIGS. 2A and 2B.

FIG. 2A may illustrate a distortion of a touch image when a ratio of a width, length, and thickness is 16:9:1.6. That is, FIG. 2A illustrates the distortion of the touch image sensed when a thickness of the 16:9 multi-touch sensing apparatus is set to be 1/10 of the width based on a location of the camera. FIG. 2B illustrates a distortion of a touch image when a ratio of a width, length, and thickness is 16:9:3.2. That is, FIG. 2B illustrates the distortion of the touch image sensed when a thickness of the 16:9 multi-touch sensing apparatus is set to be 1/5 of the width based on the location of the camera.

Referring to FIG. 2A, when a surface of the touch image 201, displayed on a display panel, is diagonally divided into four triangular sides, a sensed side may be different depending on a distance between each of the four sides and the camera, and the inclined angle. That is, a side close to the camera may be sensed more widely than a side far from the camera. Accordingly, when a coordinate transformation map is generated, a mapping space among points in the side far from the camera may be smaller than a mapping space in the side close to the camera. When FIG. 2A and FIG. 2B are compared, as the thickness of the multi-touch sensing apparatus increases, the distortion of the side far from the camera may be alleviated.

Figure 3:
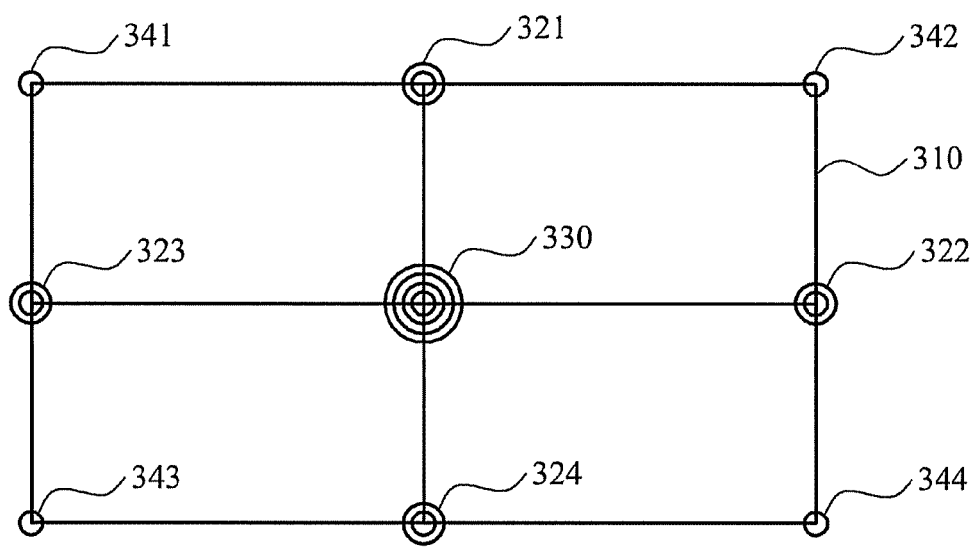
FIG. 3 illustrates a calibration of a camera according to example embodiments.

FIG. 3 illustrates a calibration of a camera according to example embodiments.

Referring to FIG. 3, points 341, 342, 343, and 344 may indicate a touch point on a display panel for each of four cameras. Points 321, 322, 323, and 324 may indicate a touch point shared by two cameras, and a point 330 may indicate a touch point shared by the four cameras. A multi-touch sensing apparatus may map the four points recognized by each of the four cameras to a two-dimensional location on a screen, and thereby may generate a coordinate transformation map of each of the cameras.

That is, each of the points of FIG. 3 may indicate a location to calibrate each of the cameras to enable the cameras to sense a touch image displayed on a display panel.

Figure 4:
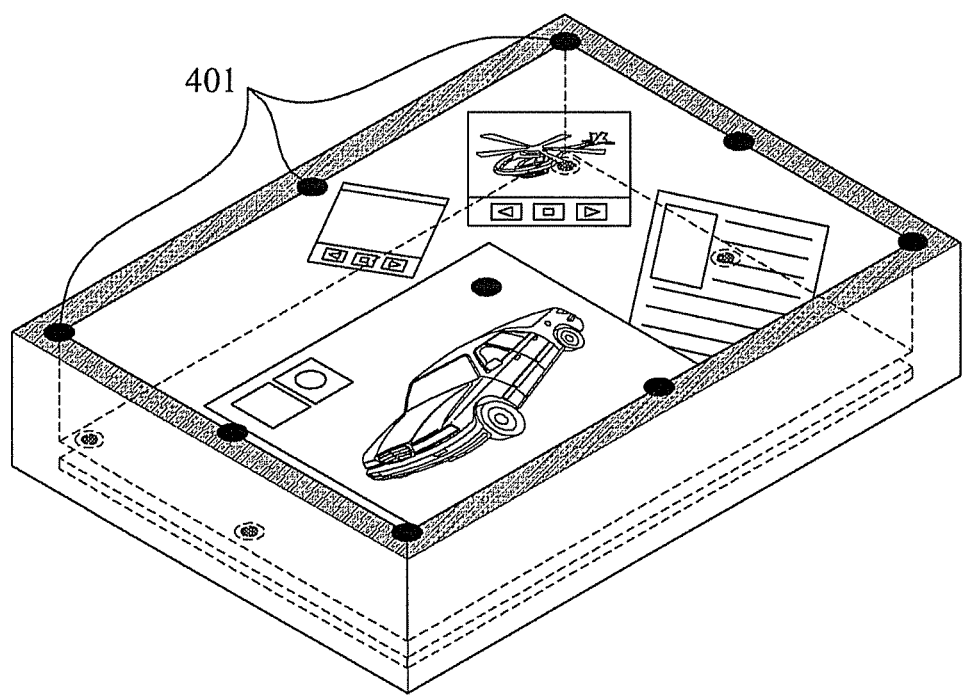
FIG. 4 illustrates an example of a marker attached to a display panel according to example embodiments.

FIG. 4 illustrates an example of markers 401 attached to a display panel according to example embodiments.

FIG. 4 illustrates a structure to recognize a location of the markers 401 using a camera when power of a multi-touch sensing apparatus is initially on. Here, the markers 401 may be attached to a back side of the display panel and react to IR (infrared). Also, the markers 401 may include a photo-sensitive sheet or an IR fluorescent material that may be photo-sensitive or reflect IR. The eight markers 401, located in an edge of the display panel, may consist of an IR LED or an IR photo-sensitive material (which is transparent to a visible ray). The marker 401 located in a center of the display panel may be transparent to a visible ray, and include a material that may be photo-sensitive or reflect IR. For example, the marker 401 located in the center of the display panel may display an image to induce a user's touch on the display panel, and be used as a coordinate of a location where the user touches.

Figure 5:
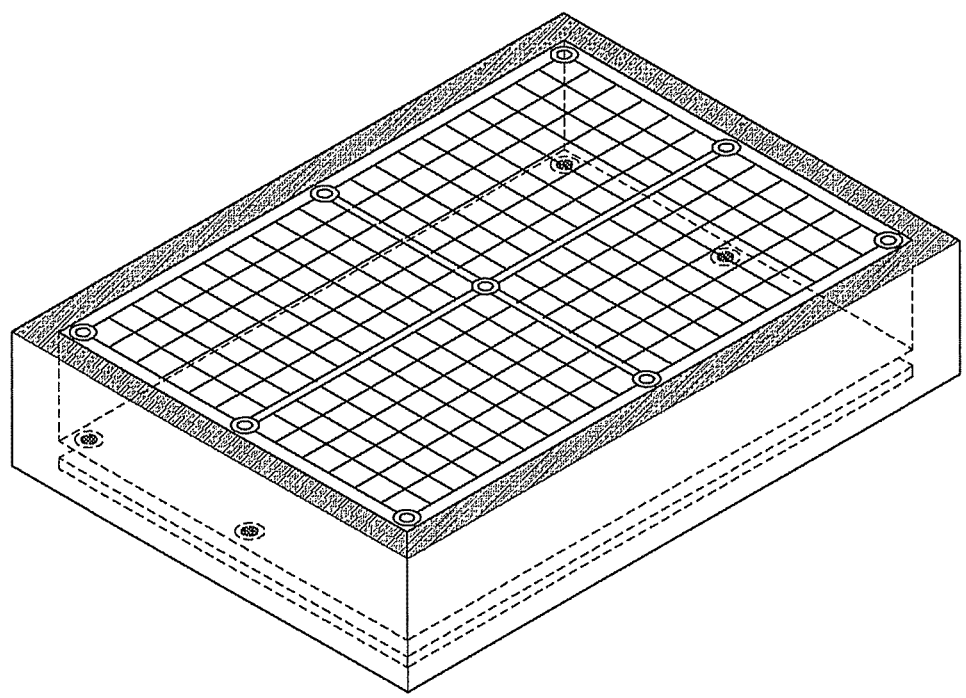
FIG. 5 illustrates a grid to sense a touch image according to example embodiments.

FIG. 5 illustrates a grid to sense a touch image according to example embodiments.

FIG. 5 illustrates a structure to display a background and a grid on a display panel when a camera is an IR camera and a power of a multi-touch sensing apparatus is initially on. The IR camera may distinguish the grid from the background. In this instance, the background may be represented in black, and the grid may be represented in white and yellow.

For example, when four cameras are located in an edge of a lower side of the multi-touch sensing apparatus, each of the cameras may scan a grid in a region overlapped when nine points are lined up, may map an actual location of the display panel to a location of a grid sensed by each of the cameras, and thereby may generate a coordinate transformation map.

Figure 6B:
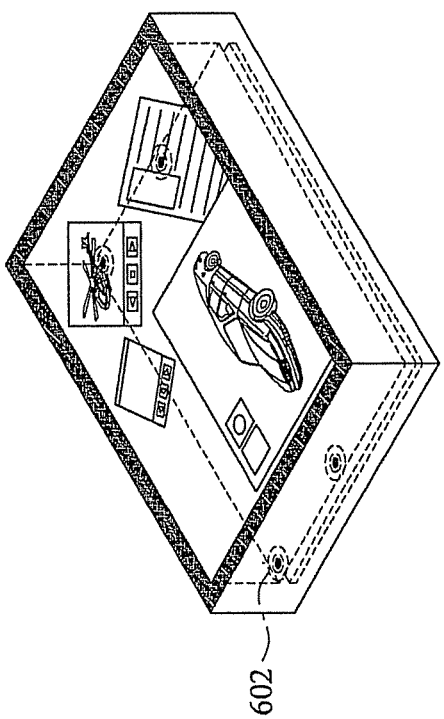
FIGS. 6A and 6B illustrate a multi-touch sensing apparatus where a sensing light source is arranged adjacent to a camera according to example embodiments.
Figure 6A:
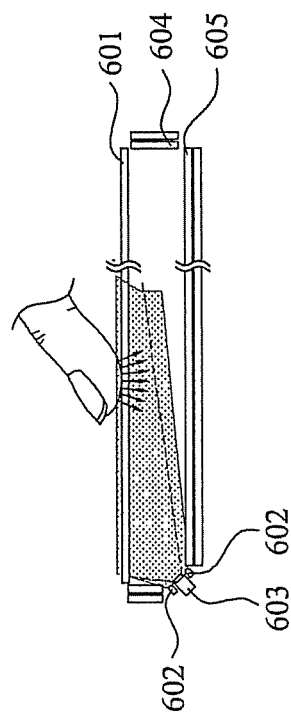

FIGS. 6A and 6B illustrate a multi-touch sensing apparatus where sensing light sources 602 are arranged adjacent to a camera 603 according to example embodiments.

A display panel 601 may be arranged on an upper side of the multi-touch sensing apparatus and display an image. Also, the sensing light source 602 may emit a light to sense a touch image displayed on a back side of the display panel 601. The touch image may be generated by an object located on the display panel 601. The object may indicate a user's hand or a stick touching the display panel 601. Also, the sensing light sources 602 may emit IR. For example, the sensing light sources 602 may be arranged adjacent to the camera 603 and emit the light to a sensing area of the camera 603. Also, the multi-touch sensing apparatus may include diffusers 604 and 605 and a backlight below the diffuser 605.

The camera 603 may divide and sense the touch image. Specifically, the camera 603 may sense the touch image reflected by the object. As illustrated in FIGS. 6A and 6B, the camera 603 may be arranged in an edge of a lower side of the multi-touch sensing apparatus. A number of cameras may not be limited. Since the camera 603 is arranged in the edge of the lower side of the multi-touch sensing apparatus, the multi-touch sensing apparatus may be thin.

However, the camera 603 may be inclined by a predetermined angle to sense the touch image. As described above, since the multi-touch sensing apparatus becomes thin, a distance to sense the touch image through the camera 603 may become relatively small. Also, distortion of the touch image may be caused by the inclination of the camera 603. The distortion may be corrected by a distortion correction apparatus included in the multi-touch sensing apparatus.

Figure 7A:
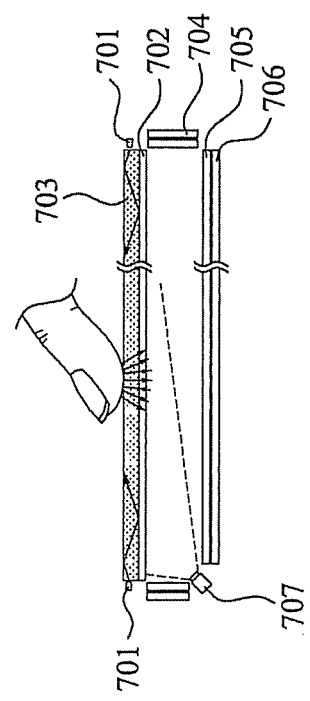
FIGS. 7A and 7B illustrate a multi-touch sensing apparatus using frustration of a total internal reflection according to example embodiments.
Figure 7B:
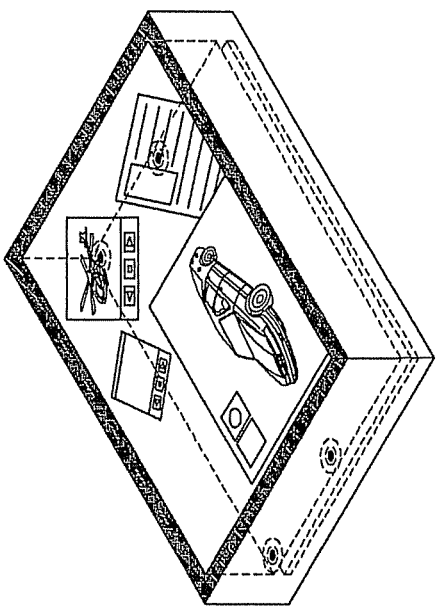

FIGS. 7A and 7B illustrate a multi-touch sensing apparatus using frustration of a Total Internal Reflection (TIR) according to example embodiments.

A display panel 702 may be arranged on an upper side of the multi-touch sensing apparatus and display an image. When the display panel 702 is an LCD, the display panel 702 may not emit a light on its own, and thus the image may be displayed by light emitted by a diffuser 705 and a backlight 706. Also, the multi-touch sensing apparatus may include a reflecting plate 704 that may reflect and diffuse the light emitted by the backlight 706.

A sensing light source 701 may emit a light to sense a touch image displayed on a back side of the display panel 702. The touch image may be generated by an object located on the display panel 702. For example, the sensing light source 701 may be arranged to emit the light to an inside of a transparent layer 703. The transparent layer 703 may be located on an upper side of the display panel 702, and the light emitted from the sensing light source 701 may be IR. In this instance, the transparent layer 703 may generate a TIR (total internal reflection) of the light emitted from the sensing light source 701. Also, the transparent layer 703 may include a transparent material such as a glass, acryl, polycarbonate plate, and the like.

When the object such as a user's hand or a stick is located on the display panel 702, a TIR generated in the transparent layer 703 may be frustrated, which is called Frustrated TIR (FTIR). A camera 707 may identify a location where the TIR of the light, emitted from the sensing light source 701, is frustrated by the object, and may sense a touch image corresponding to the identified location. Also, the camera 707 may divide and sense the touch image.

Figure 8:
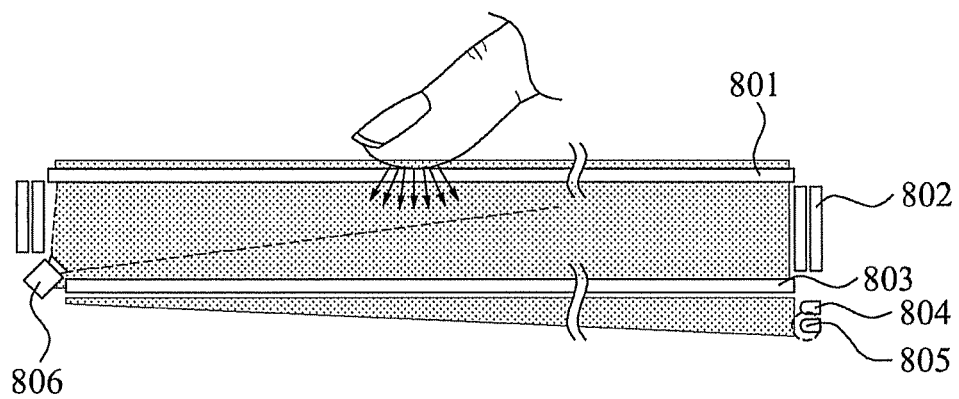
FIG. 8 illustrates a first multi-touch sensing apparatus where a sensing light source is arranged below a diffuser according to example embodiments.

FIG. 8 illustrates a first multi-touch sensing apparatus where a sensing light source 805 is arranged below a diffuser 803 according to example embodiments.

A display panel 801 may be arranged on an upper side of the multi-touch sensing apparatus and display an image. When the display panel 801 is an LCD, the display panel 801 may not emit a light on its own, and thus the image may be displayed by light emitted by the diffuser 803 and a backlight 804. Also, the multi-touch sensing apparatus may include a reflecting plate 802 that may reflect and diffuse the light emitted by the backlight 804.

The sensing light source 805 may emit a light to sense a touch image displayed on a back side of the display panel 801. The touch image may be generated by an object located on the display panel 801. For example, the sensing light source 805 may be arranged below the diffuser 803, and emit the light to the object. Referring to FIG. 8, when the sensing light source 805 emits the light, a direction of the light may be changed to be vertical to the display panel 801 due to the diffuser 803, which is inclined by a predetermined angle, and thus the sensing light source 805 may emit the light to the object.

A camera 806 may be arranged in an edge of a lower side of the multi-touch sensing apparatus. In this instance, the camera 806 may divide and sense a touch image. When the light emitted by the sensing light source 805 is reflected by the object, the camera 806 may sense the light reflected by the object.

Figure 9:
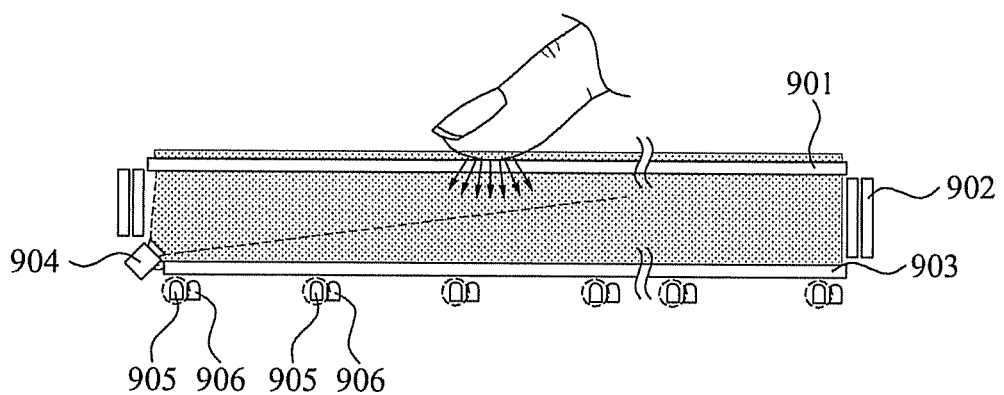
FIG. 9 illustrates a second multi-touch sensing apparatus where a sensing light source is arranged below a diffuser according to example embodiments.

FIG. 9 illustrates a second multi-touch sensing apparatus where a sensing light source is arranged below a diffuser according to example embodiments.

Different from FIG. 8, a sensing light source 905 may be arranged below a diffuser 903, and emit a light to a display panel 901 to be vertical relative to the diffuser 903. Also, a backlight 906 may be arranged adjacent to the sensing light source 905. Also, the multi-touch sensing apparatus may include a reflecting plate 902 that may reflect and diffuse the light emitted by the backlight 906.

A camera 904 may sense a touch image reflected from an object by a light emitted by the sensing light source 905.

Figure 10A:
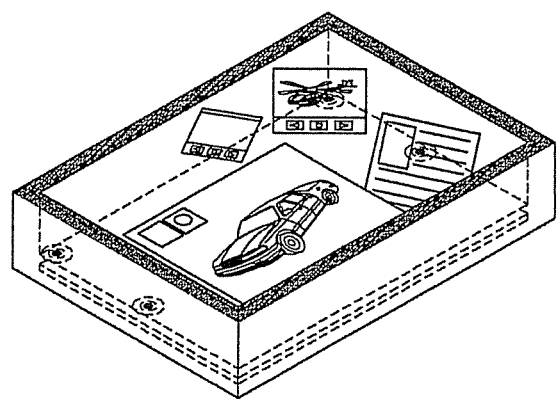
FIGS. 10A, 10A', 10B and 10B' illustrate a multi-touch sensing apparatus including an optical shutter according to example embodiments.
Figure 10A:
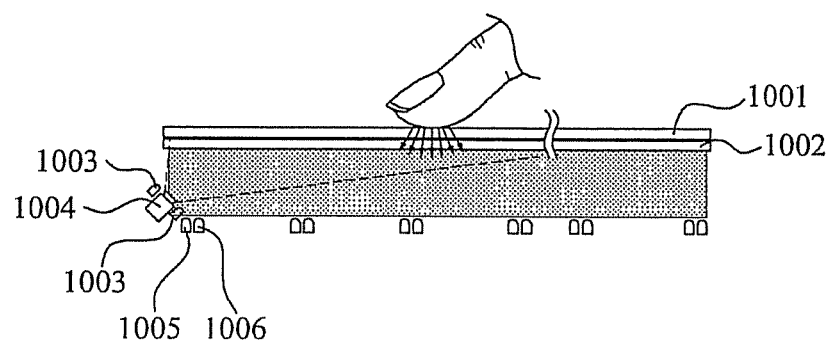

FIGS. 10A and 10A' and 10B and 10B' illustrate a multi-touch sensing apparatus including an optical shutter 1002 according to example embodiments.

A display panel 1001 may be arranged on an upper side of the multi-touch sensing apparatus and display an image. When the display panel 1001 is an LCD, the display panel 1001 may not emit a light on its own, and thus the image may be displayed by light emitted by a backlight 1006.

For example, the multi-touch sensing apparatus may include the optical shutter 1002 that may change an optical transmission according to electric switching. In this instance, the optical shutter 1002 may function as a diffuser for a backlight 1006. As illustrated in FIGS. 10A, 10A', 10B and 10B', the optical shutter 1002 may be arranged below the display panel 1001. An optical shutter may include a device where optical transmission changes depending on supply of high voltage, such as with a Polymer Stabilized Cholestreic Textured (PSCT) (switch between diffusing and clearing at 60 Hz, 150 V), and a Polymer Dispersed Liquid Crystal (PDLC). The optical shutter 1002 may improve a quality of a displayed image and a sensing sensitivity of the multi-touch sensing apparatus.

Also, a sensing light source 1003 may be arranged in an edge of a lower side of the multi-touch sensing apparatus, and be arranged adjacent to a camera 1004. Also, a sensing light source 1005 may be arranged in the lower side of the multi-touch sensing apparatus, and emit a light to be vertical to the display panel 1001. The optical shutter 1002 may shut or pass the light, emitted by the sensing light sources 1003 and 1005 to the display panel 1001, by changing the optical transmission according to electric switching.

The camera 1004 may be arranged in the edge of the lower side of the multi-touch sensing apparatus. An optical sensor array may be substituted for the camera 1004 and be arranged below the display panel 1001. The optical sensor array may sense the light emitted from the sensing light source 1003.

Figure 10B:
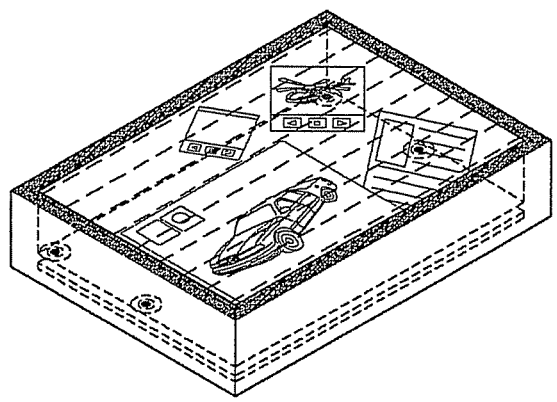
Figure 10B:
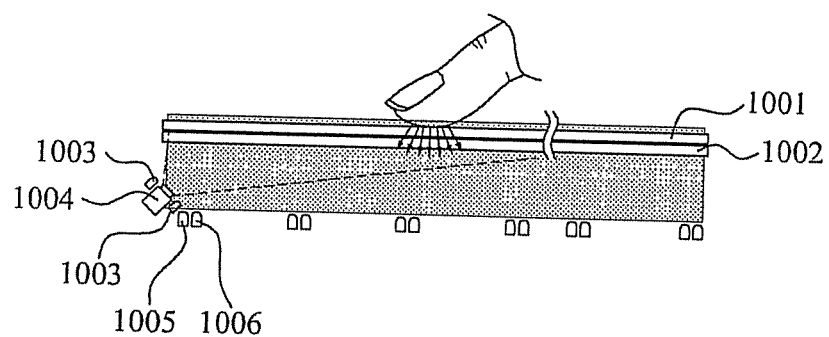

FIGS. 10A and 10A' may illustrate a status when the optical shutter 1002 is on, and FIGS. 10B and 10B' may illustrate a status when the optical shutter 1002 is off. That is, when the optical shutter 1002 is on, the optical transmission of the optical shutter 1002 may have translucency. When the optical shutter 1002 is off, the optical transmission of the optical shutter 1002 may have transparency.

Then, the optical shutter 1002 impedes the light emitted from the sensing light source when the optical transmission of the optical shutter has translucency, and passes the light emitted from the sensing light source when the optical transmission of the optical shutter has transparency.

The optical shutter 1002 may function as a diffuser in the translucent state, and spread the light emitted from the backlight 1006. Accordingly, the display panel 1001 may display the image. In this instance, the sensing light source 1005 may not emit the light. Conversely, since the optical shutter 1002 may not function as the diffuser in the transparent state, the optical shutter 1002 may not spread the light emitted from the backlight 1006. Accordingly, the sensing light source 1005 may emit the light.

Accordingly, the camera 1004 may sense the touch image where the light emitted from the sensing light sources 1003 and 1005 is reflected by the object.

Figure 11:
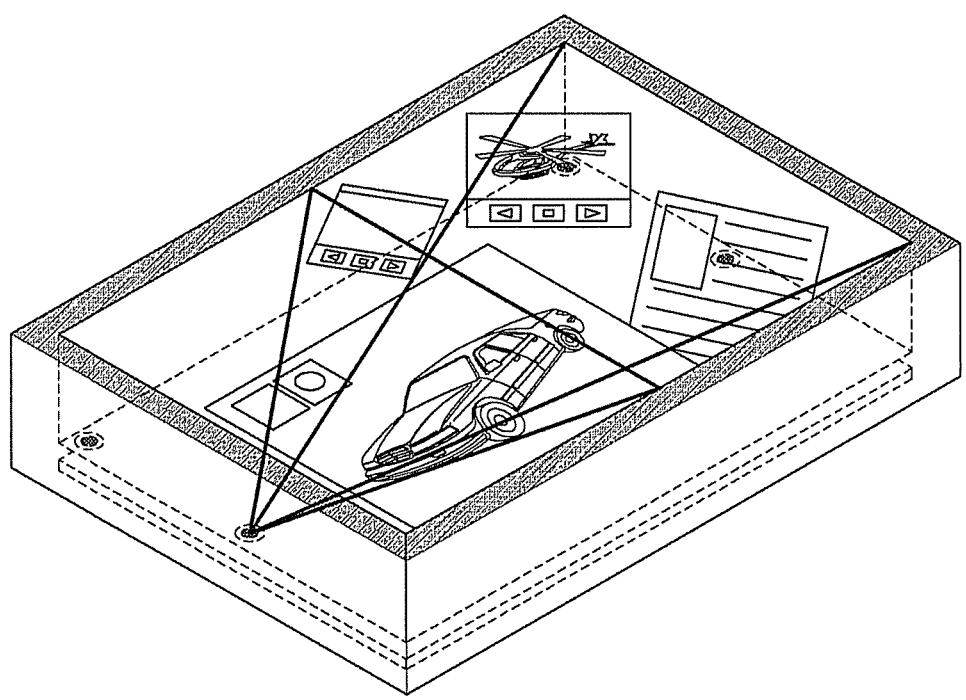
FIG. 11 illustrates a multi-touch sensing apparatus that senses a touch image using two cameras according to example embodiments.

FIG. 11 illustrates a multi-touch sensing apparatus that senses a touch image using two cameras according to example embodiments.

Referring to FIG. 11, a camera may be arranged in an edge of a lower side of the multi-touch sensing apparatus. In particular, the camera may be located in a middle of the edge of the lower side of the multi-touch sensing apparatus. In this instance, since an angle which may be sensed by the camera may be limited, the multi-touch sensing apparatus may arrange at least two cameras. The at least two cameras may be arranged in opposite sides and sense the touch image displayed on a back side of a display panel.

Figure 12:
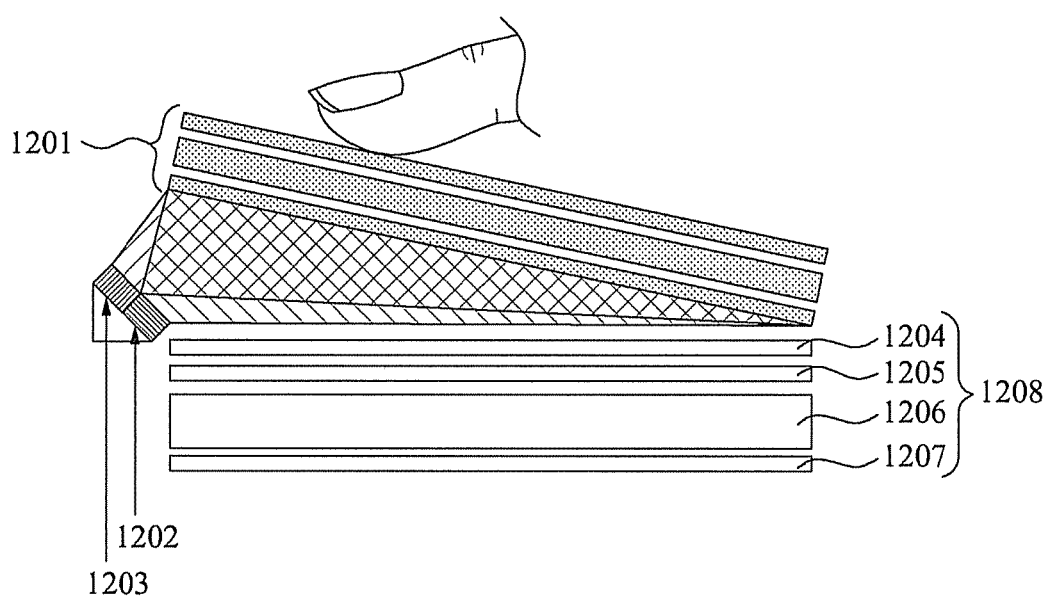
FIG. 12 illustrates a multi-touch sensing apparatus including a display panel which is inclined by a predetermined angle according to example embodiments.

FIG. 12 illustrates a multi-touch sensing apparatus including a display panel which is inclined by a predetermined angle according to example embodiments.

In particular, FIG. 12 illustrates the multi-touch sensing apparatus sensing a touch image using a single camera. For example, a display panel 1201 may be inclined by a predetermined angle. The angle may not be limited.

In this instance, a sensing light source 1203 may emit a light to sense a touch image generated by an object located on the display panel 1201. The single camera 1202 may be arranged in an edge of the lower side of the multi-touch sensing apparatus. The camera 1202 may sense the touch image displayed on a back side of the display panel 1201. In this instance, since the display panel 1201 is inclined, the touch image may be sensed by the camera 1202.

Also, the multi-touch sensing apparatus may include a backlight 1208 which emits a light to display the image on the display panel 1201. The backlight 1208 may include a diffuser 1205, a Brightness Enhancement Film (BEF) 1204, a light guide panel 1206, and a reflecting plate 1207.

FIG. 13 illustrates a multi-touch sensing apparatus that senses a touch image using a plane mirror according to example embodiments.

The multi-touch sensing apparatus may include a display panel 1304 which is arranged in an upper side of the multi-touch sensing apparatus and displays an image. When the display panel 1304 is an LCD, the display panel 1304 may not emit a light on its own. Accordingly, the image may be displayed by a light emitted by a diffuser 1305 and a backlight 1306.

Also, the multi-touch sensing apparatus may include a sensing light source 1302. The sensing light source 1302 may emit a light to sense a touch image which is generated by an object and displayed on a back side of the display panel 1304. The object may be located on the display panel 1304. Also, the multi-touch sensing apparatus may include a mirror 1303 to be arranged in an edge of a lower side of the multi-touch sensing apparatus and to reflect the touch image. Also, the multi-touch sensing apparatus may include a camera 1301 to divide the touch image reflected by the mirror 1303, and to sense the touch image. In this instance, the camera 1301 may be arranged below the display panel 1304. For example, the mirror 1303 of FIG. 13 may include a plane mirror.

Figure 13B:
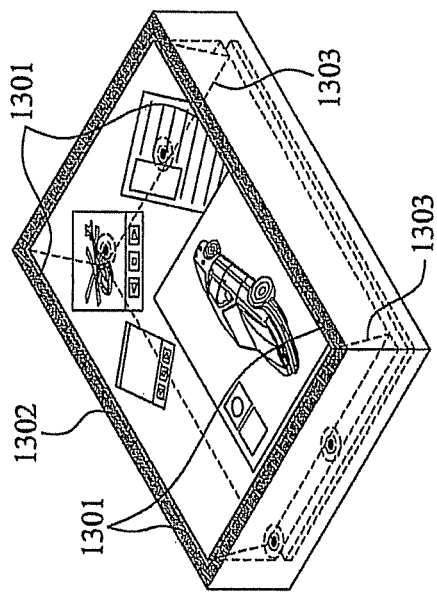
FIGS. 13A and 13B illustrate a multi-touch sensing apparatus that senses a touch image using a plane mirror according to example embodiments.
Figure 13A:
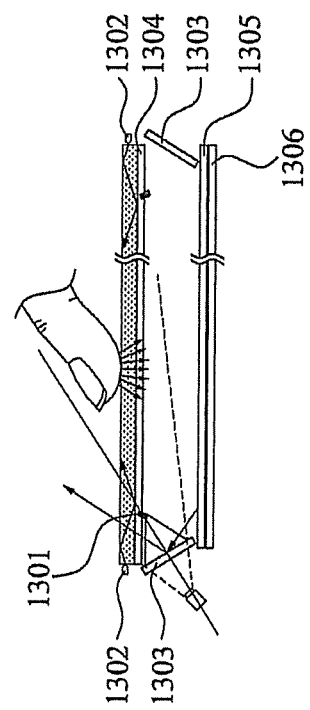

In FIGS. 13A and 13B, the sensing light source 1302 may be arranged to emit the light to an inside of a transparent layer located on the display panel 1304. The transparent layer may generate a total internal reflection of the light reflected from the sensing light source 1302.

As illustrated in FIG. 13, the mirror 1303 may be inclined by a predetermined angle with the edge of the lower side of the multi-touch sensing apparatus. When a user touches the display panel 1304 using the user's hands or a stick, the camera 1301 may sense the touch image which is reflected by the mirror 1303 and displayed on a back side of the display panel 1304. In this instance, the camera 1301 may identify a location where the total internal reflection of the light, emitted from the sensing light source 1302, is frustrated by the object, and sense the touch image corresponding to the identified location.

When the mirror 1303 is used, a distance between the camera 1301 and the back side of the display panel 1304 may decrease. Accordingly, a thickness of the multi-touch sensing apparatus may decrease. Also, when the camera 1301 is arranged in an inner side, as opposed to the edge of the lower side of the multi-touch sensing apparatus, and thus a width of a bezel around the multi-touch sensing apparatus may decrease. Also, when the thickness of the multi-touch sensing apparatus decreases, a distance between the backlight 1306 and the display panel 1304 may decrease. Accordingly, light may not reach an edge of the display panel 1304, and thus the multi-touch sensing apparatus may become dark. However, when the mirror 1303 is used, the multi-touch sensing apparatus may reflect the light emitted from the backlight 1306, and supplement the light from the backlight 1306.

FIGS. 14A and 14B illustrate a multi-touch sensing apparatus that senses a touch image using a concave mirror or a convex mirror according to example embodiments.

The multi-touch sensing apparatus may include a display panel 1404 which is arranged in an upper side of the multi-touch sensing apparatus and displays an image. When the display panel 1404 is an LCD, the display panel 1404 may not emit light on its own. Accordingly, the image may be displayed by a light emitted by a diffuser 1405 and a backlight 1406.

Also, the multi-touch sensing apparatus may include a sensing light source 1402. The sensing light source 1402 may emit a light to sense a touch image which is generated by an object and displayed on a back side of the display panel 1404. The object may be located on the display panel 1404. Also, the multi-touch sensing apparatus may include mirrors 1403 and 1407. Each of the mirrors 1403 and 1407 may be arranged in an edge of a lower side of the multi-touch sensing apparatus and reflect the touch image. Also, the multi-touch sensing apparatus may include a camera 1401 to divide the touch image reflected by each of the mirrors 1403 and 1407, and to sense the touch image. In this instance, the camera 1401 may be arranged below the display panel 1404. For example, the mirrors of FIGS. 14A and 14B may include the convex mirror 1403 or the concave mirror 1407.

In FIG. 14, the sensing light source 1402 may be arranged to emit the light to an inside of a transparent layer located on the display panel 1404. The transparent layer may generate a total internal reflection of the light reflected from the sensing light source 1402.

As illustrated in FIG. 14, each of the mirrors 1403 and 1407 may be inclined by a predetermined angle with the edge of the lower side of the multi-touch sensing apparatus. When a user touches the display panel 1404 using the user's hands or a stick, the camera 1401 may sense the touch image which is reflected by each of the mirrors 1403 and 1407 and displayed on a back side of the display panel 1404. In this instance, the camera 1401 may identify a location where the total internal reflection of the light, emitted from the sensing light source 1402, is frustrated by the object, and sense the touch image corresponding to the identified location.

A thickness of the multi-touch sensing apparatus when the convex mirror 1403 and the concave mirror 1407 are used may decrease when a plane mirror is used. Also, when the convex mirror 1403 and the concave mirror 1407 are used, the camera 1401 may sense a wide range of touch images. Accordingly, although the multi-touch sensing apparatus includes the camera 1401 including a standard lens where an angle of view is approximately 60 degrees, the camera 1401 may function as a camera including a wide angle lens. Also, when a curved surface of a mirror is finely designed, the camera 1401 is to be located and an angle each of the mirrors 1403 and 1407 is to be set, the multi-touch sensing apparatus may reduce or remove distortion of the touch image without an apparatus to correct a distortion of the touch image.

According to example embodiments, a camera to sense a touch image may be arranged in an edge of a lower side of a multi-touch sensing apparatus, and be inclined by a predetermined angle, and thus a thickness of the multi-touch sensing apparatus may decrease.

Also, according to example embodiments, a distortion, generated due to a thin multi-touch sensing apparatus and inclination of a camera, of a touch image may be corrected.

Also, according to example embodiments, an optical shutter where an optical transmission changes according to electric switching may be included instead of a diffuser, and thus an image quality and a sensing sensitivity may be improved.

Also, according to example embodiments, a touch image may be reflected by a plane mirror, and thus a thickness of a multi-touch sensing apparatus and a bezel of a display panel may decrease, and a backlight of an edge of the display panel may be supplemented.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A multi-touch sensing apparatus, comprising:
    a display panel on an upper side of the multi-touch sensing apparatus and to display an image;
    a sensing light source to emit a light to sense a touch image which is generated by an object and displayed on a back side of the display panel, the object being located on the display panel; and
    an image sensor to be arranged on an edge of a lower side of the multi-touch sensing apparatus, and sense the touch image, wherein:
    the image sensor is inclined by a predetermined angle with the lower side of the multi-touch sensing apparatus to sense the touch image,
    a marker which reacts to the light is attached to the display panel, and
    a location of the marker, which is recognized using the image sensor, is used to correct a distortion of the touch image due to the inclination of the image sensor.

2. The multi-touch sensing apparatus of claim 1, wherein the image sensor is arranged below the display panel.

3. The multi-touch sensing apparatus of claim 1, wherein the image sensor is an optical sensor array.

4. The multi-touch sensing apparatus of claim 1, wherein the sensing light source is arranged adjacent to the image sensor, and is arranged in an edge of the lower side or the lower side of the multi-touch sensing apparatus.

5. The multi-touch sensing apparatus of claim 1, wherein the optical shutter switches between a translucent state and a transparent state.

6. The multi-touch sensing apparatus of claim 1, further comprising:
    an optical shutter on a lower side of the display panel and to change an optical transmission according to electric switching,
    wherein the optical shutter shuts or passes the light, emitted by the sensing light source to the display panel, by changing the optical transmission.

7. The multi-touch sensing apparatus of claim 6, wherein the optical shutter impedes the light emitted from the sensing light source when the optical transmission of the optical shutter is translucent, and passes the light emitted from the sensing light source when the optical transmission of the optical shutter is transparent.

* * * * *